United States Patent [19]

Broadway

[11] 4,176,820
[45] Dec. 4, 1979

[54] PRESSURE-SENSITIVE TEMPERATURE-RESPONSIVE ROTARY VALVE FOR CRYOGENIC TEMPERATURES

[75] Inventor: William W. Broadway, Houston, Tex.

[73] Assignee: FMC Corporation, San Jose, Calif.

[21] Appl. No.: 812,951

[22] Filed: Jul. 5, 1977

[51] Int. Cl.² ............................................. F16K 1/22
[52] U.S. Cl. .................................. 251/317; 251/306; 251/173
[58] Field of Search ............... 251/173, 306, 307, 316, 251/317, 171

[56] References Cited

U.S. PATENT DOCUMENTS

| | | | |
|---|---|---|---|
| 3,260,496 | 7/1966 | Borcherdt | 251/171 |
| 3,380,709 | 4/1968 | Scaramucci | 251/317 |
| 3,398,926 | 8/1968 | Scaramucci | 251/317 |
| 3,462,120 | 8/1969 | Priese | 251/315 |
| 3,486,736 | 12/1969 | Scaramucci | 251/317 |
| 3,596,876 | 8/1971 | Scaramucci | 251/306 |
| 3,997,142 | 12/1976 | Broadway | 251/307 |

*Primary Examiner*—William R. Cline
*Assistant Examiner*—H. Jay Spiegel
*Attorney, Agent, or Firm*—Lloyd B. Guernsey; W. William Ritt, Jr.

[57] ABSTRACT

A rotary valve for providing control of fluid flow throughout a wide range of pressures and temperatures. The valve includes a pressure-sensitive and temperature-responsive flexible annular seat that cooperates with the valve's flow control element to establish a fluid seal, and a temperature-responsive rigid energizer ring for maintaining both a radial and an axial load on the seat through a wide range of ambient and low temperatures. The valve seat includes an annular, radially outward extending support leg that is held in position against a radial surface of the valve's body by the energizer ring, at least one outer annular sealing lip that extends in a generally axial direction from the leg, and a central sealing lip that extends radially inwardly from the support leg toward the flow control element. At ambient temperatures a portion of the outer sealing lip presses against the flow control element when the valve is closed, and when the temperature is lowered toward the cryogenic range the central sealing lip moves into fluid-tight contact with the flow control element, thereby providing an additional seal at the lower temperatures. The energizer ring has a generally wedge-shaped cross-sectional configuration, and is held in position in the valve body by a retainer ring that is releasably secured, as by screws, to the valve body for quick and easy servicing of the seat. The energizer ring has a frusto-conical radial surface that cooperates with the corresponding surface on the retainer ring to maintain the energizer ring constantly wedged tightly against the valve seat, thereby assuring that the seat is retained securely in the valve body and is continually forced against the valve's flow control element throughout the entire range of operating temperatures and pressures.

10 Claims, 6 Drawing Figures

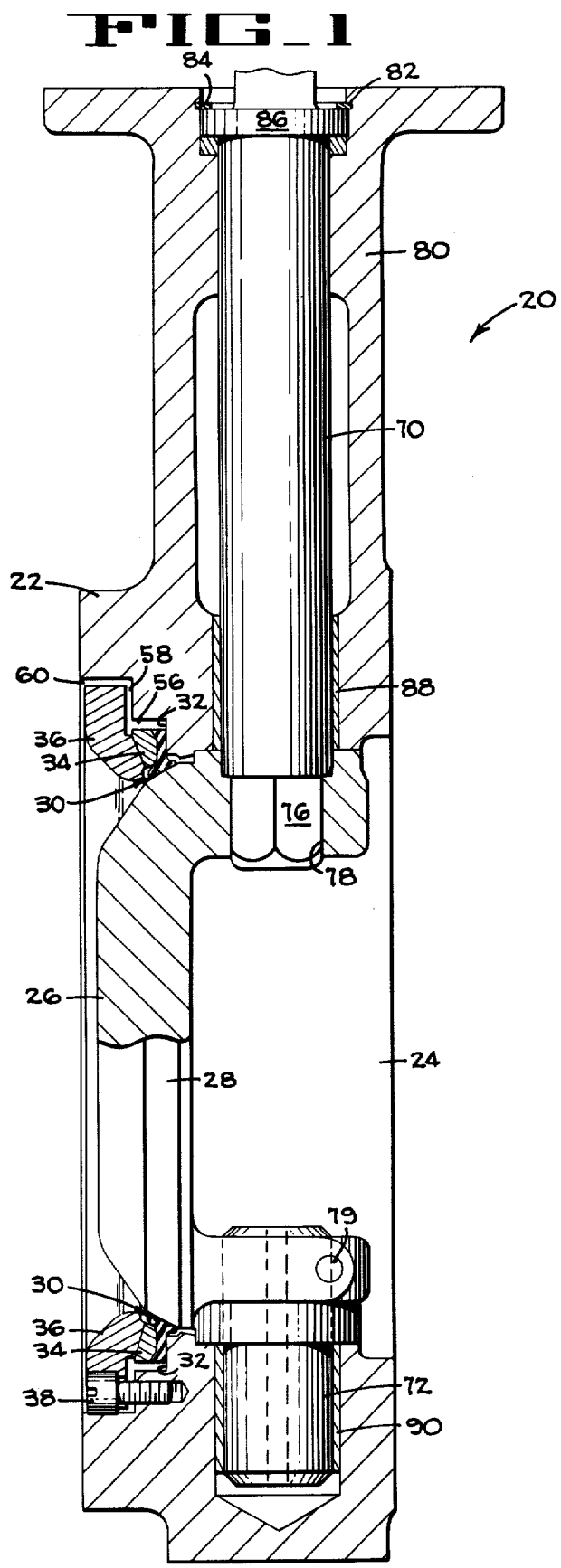

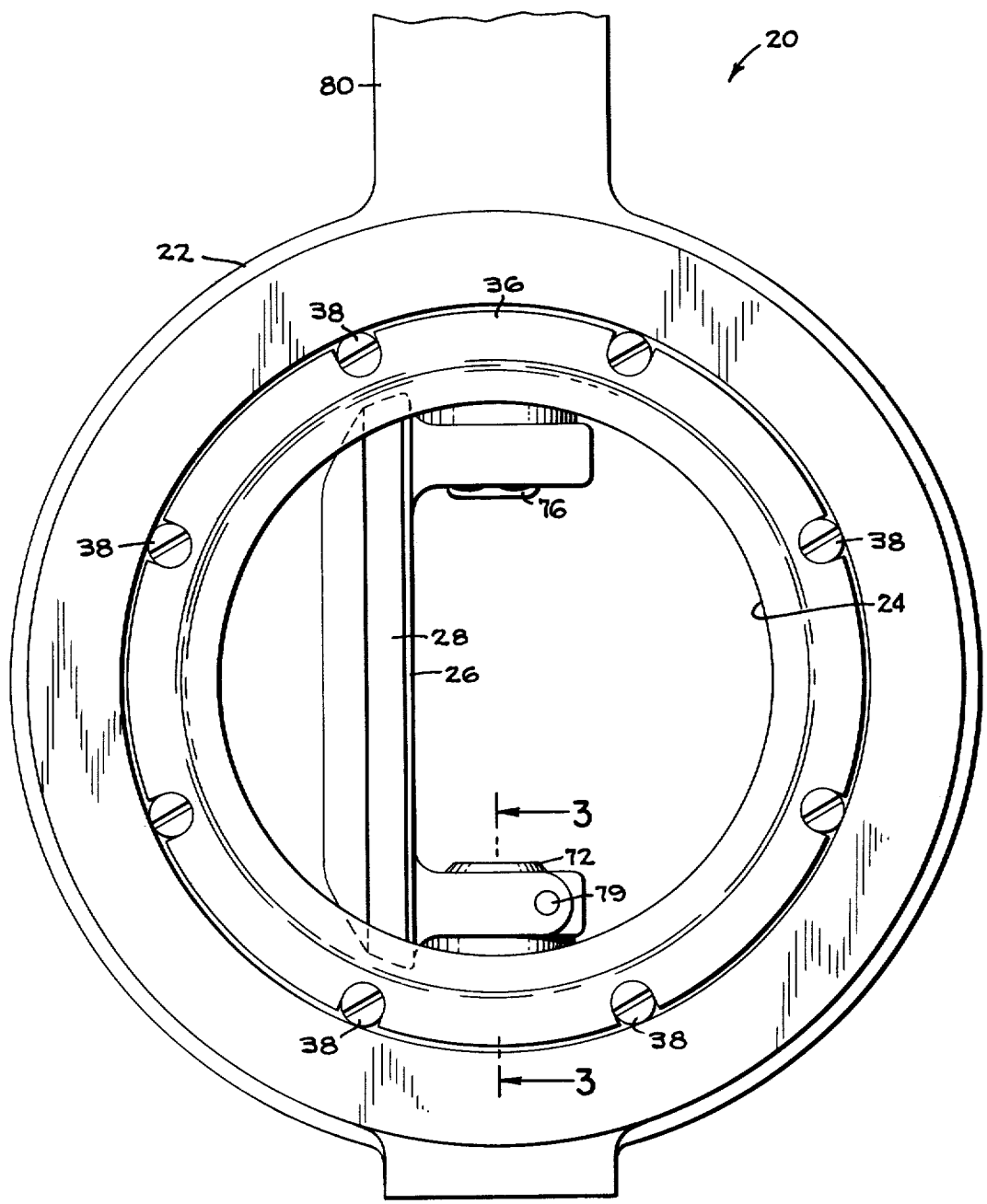
FIG_2

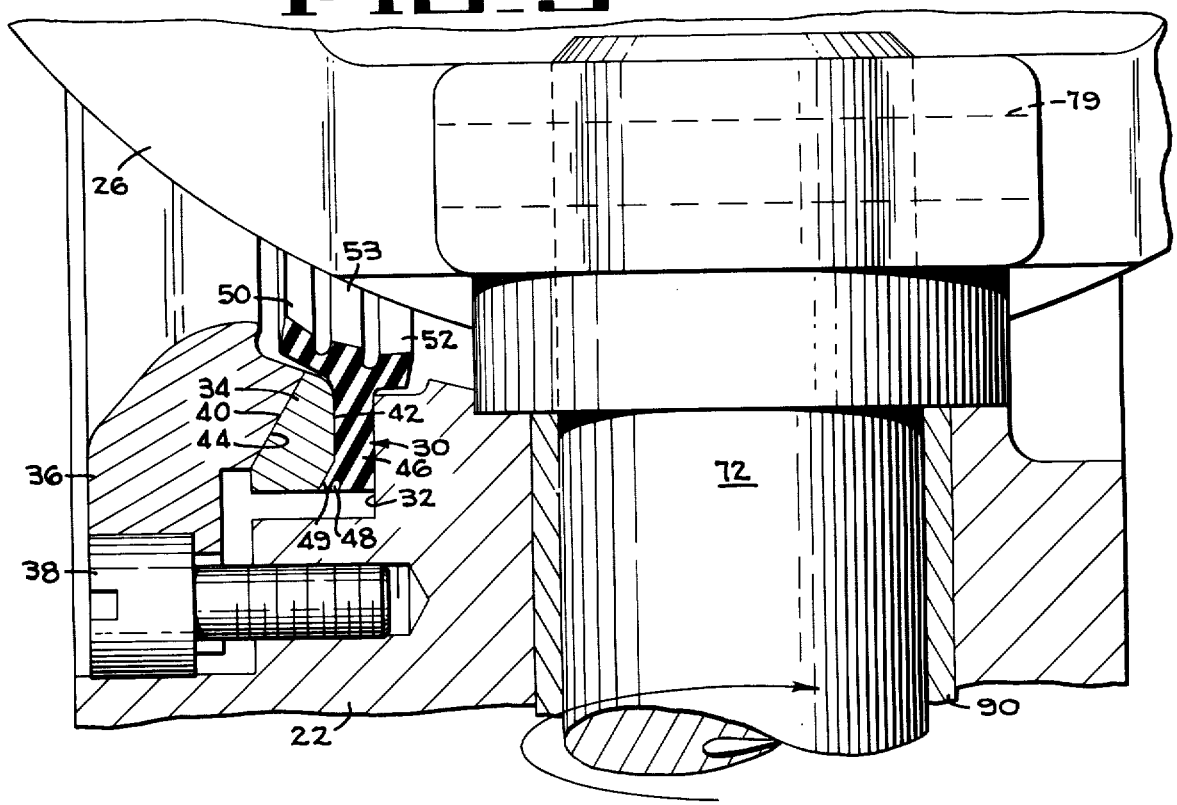
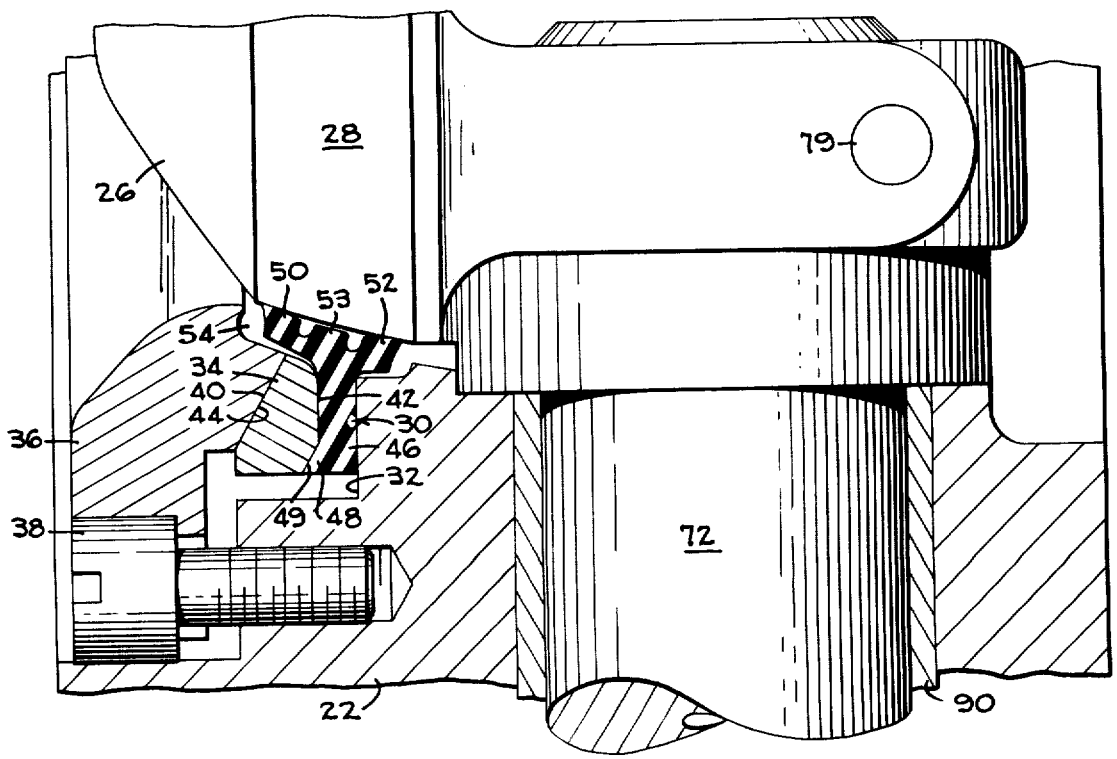

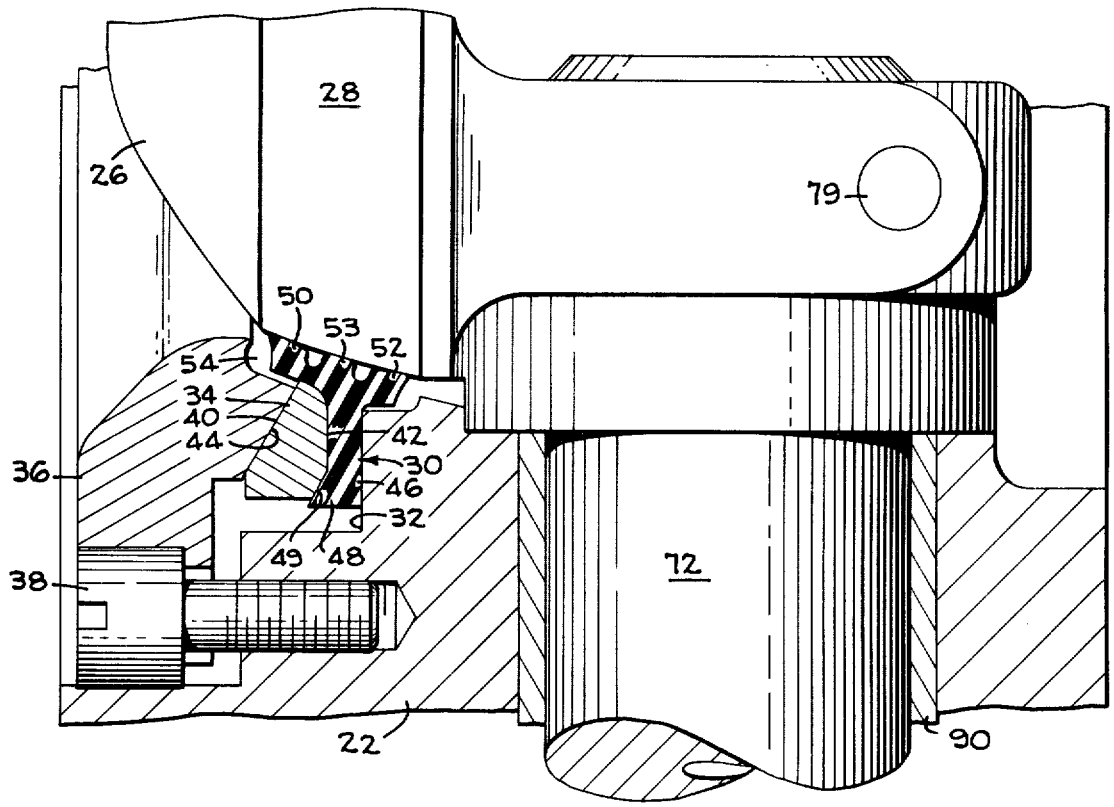
FIG_5
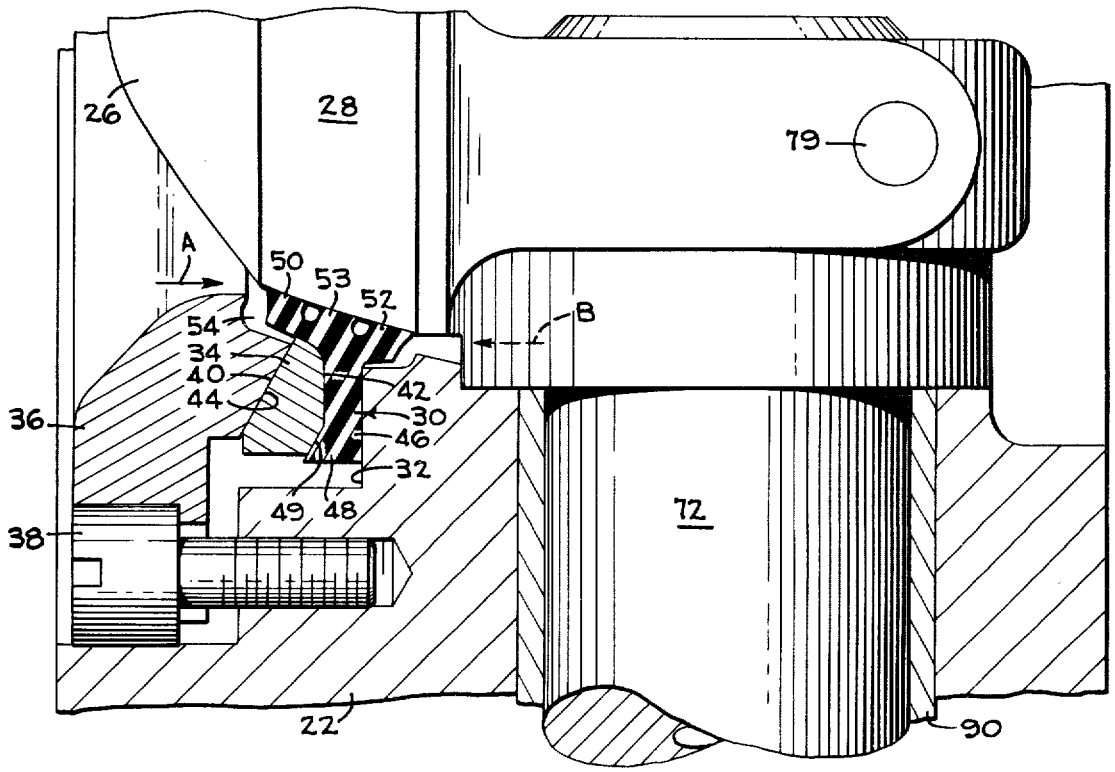
FIG_6

PRESSURE-SENSITIVE TEMPERATURE-RESPONSIVE ROTARY VALVE FOR CRYOGENIC TEMPERATURES

BACKGROUND OF THE INVENTION

1. Field of the Invention

This invention relates to rotary valves, and more particularly to butterfly valves with annular seats especially for use under a wide range of pressures and for ambient and low temperatures. This invention is an improvement of the invention disclosed in my prior U.S. Pat. No. 3,997,142, issued Dec. 14, 1976.

2. Description of the Prior Art

Butterfly and other types of rotary valves with annular yieldable seats constructed of Teflon, Kel-F, and other polymeric materials, are well-known and commonly used for controlling the flow of various fluids in a wide variety of industries. Although some of these valves are satisfactory whem employed at ambient or moderate temperatures and modest pressures, experience has shown that seats of this type employed in butterfly valves often leaked when exposed to cryogenic temperatures, for these seats, like most other solid material, contract when they are cooled. This volume change affects all of the dimensions of the seat, and since the extent of contraction is also dependent upon the material from which the seat is constructed, it is quite difficult to provide a butterfly valve seat that will maintain a fluid-tight seal over a wide range of temperatures, and especially when subjected to significantly elevated pressures.

Although seats of yieldable polymeric materials are considered to be the most suitable for use in butterfly valves for wide temperature ranges, when the valve is exposed to extreme cold, as encountered in cryogenic applications, there is a tendency for the seat to shrink away from the metallic valve elements between which it is secured, thereby establishing a leakage path. Another complication is presented if the butterfly valve's disc is opened while the valve is being cooled down, for in this situation the seat tends to contract and warp out of its circular form. Maintaining the open valve at cryogenic temperatures causes the seal element to stiffen in its warped form thereby making it very difficult, if not impossible, for the seat to return to its circular shape when the valve is closed, and thus the leakage problem is compounded.

Earlier attempts to overcome these problems include the use of mechanical springs, fulcrum systems, etc., with or without temperature-responsive members, to press the seat against the valve disc and thereby hopefully to eliminate leakage. The use of springs at extremely low temperatures is undesirable because they tend to lose some of their physical characteristics. For example, when metal springs are exposed to cryogenic temperatures they become stiff and brittle; they could break and thereby permanently disable the valve. Furthermore, many of the seat energizing devices heretofore known as unduly complicated, and relatively expensive to manufacture.

What is desired is a temperature-responsive rotary valve having a valve seat that maintains a fluid-tight contact with the valve body and with the flow control element over a wide range of temperatures from ambient all the way down to cryogenic. It is desirable that the valve seat also maintains these fluid-tight contacts throughout a wide range of pressures. In order to do this, it is necessary to increase the degree of contact between the valve seat and the flow control element as the pressure of the fluid increases. It is also desirable to provide a temperature-responsive valve that is relatively simple and inexpensive to build.

SUMMARY OF THE INVENTION

The present invention comprises a butterfly or other type of rotary valve with a flexible annular seat of novel cross-sectional configuration, and a rigid seat energizer ring that cooperates in a unique manner with a seat retainer ring to provide a constant pressure both axially and radially on the seat, thereby maintaining the seat in fluid-tight contact with the valve flow control element and valve body throughout a wide temperature and pressure range.

The preferred embodiment of valve seat of the present invention functions to prevent fluid flow in either direction through the valve, and has a cross-sectional shape somewhat like the capital letter "T," with a radially outwardly extending annular support leg and a pair of flexible annular outer sealing lips that extend generally axially from the leg in opposite directions. The outer sealing lips of this bi-directional seat are pressed against the valve flow control element throughout the operating temperature range. Between the two outer lips is a central sealing lip that extends toward the flow control element, and at ambient temperature the lip does not contact the valve body. However, when the temperature decreases to a value considerably below ambient, the central lip is pressed tightly against the flow control element to thereby provide an additional fluid-tight seal at the lower temperature ranges where the outer lips may need help in maintaining the seal in fluid-tight contact with the flow control element.

When the valve is to be used to control fluid flow in only one direction, a valve seat having a cross-sectional shape somewhat like the capital letter "L" may be used. This L-shaped valve seat includes a single outer sealing lip extending generally axially from the leg in an upstream direction, plus a central sealing lip as in the aforementioned bi-directional seat.

The support leg of both seats includes an annular tang at its radially outward end that cooperates with the energizer ring to securely retain the seat in proper position in the valve especially during high fluid flow rates that tend to pull the seat from its mounting. The energizer ring continually applies radial and axial pressure on the seat to assure that a fluid-tight seal is maintained between the valve flow control element and the valve body.

The energizer ring has a radial surface that bears against the seat support leg, including its tang, and presses it axially against an opposing radial surface of the valve body, thereby securely holding the seat in fluid-tight engagement with the valve body. The opposite radial surface of the energizer ring is frusto-conical with a slope that diverges from the ring's seat contacting radial surface in an outward direction, so that in cross section the ring is generally wedge-shaped in configuration. This frusto-conical surface bears against a corresponding frusto-conical or sloping surface of a retainer ring that is releasably secured to the valve body by bolts, cap screws, or other suitable means. The retainer ring forms the outer radial wall of annular seat chamber, while a counterbore in the valve body provides the inner radial wall and the axial wall of this chamber.

The valve seat of the present invention can be comprised of a flexible or yieldable polymeric material such as polytrifluorochloroethylene, polytetrafluoroethylene, or other compositions of suitable characteristics, all of which are well-known in the prior art. The energizer ring is constructed of metal or other rigid material that has a satisfactory rate of contraction, i.e., a rate that is significantly different than that of the valve body, the retainer ring, and the valve disc or other flow control element. Accordingly, when the valve is subjected to a cryogenic temperature, the energizer ring contracts to a greater extent than the valve body, retainer ring, and flow control element, thereby continuing the radial pressure exerted on the valve seat in a direction toward the flow control element, and assuring that the seal between the seat lips and the flow control element is maintained. In addition, the contracting energizer ring causes the central lip to be pressed securely against the flow control element to provide an additional seal between the annular valve seat and the sealing surface. During this contraction, the opposed sloping surfaces of the energizer ring and the retainer ring cause the energizer ring to move axially toward the leg of the valve seat element, thereby maintaining the fluid seal between the seat and the valve body. Accordingly, no matter how low the temperature might be to which the valve is subjected, the energizer ring continues to exert pressure in both axial and radial directions against the seat to assure that the seal between the seat, the valve body, and the valve flow control, element is maintained.

Both of the outer sealing lips of the valve seat of the present invention are also responsive on the pressure side of the valve when in service. This fluid pressure acts on the outer lip on the upstream side of the valve and thereby supplements the action of the energizer ring against that outer lip, thus helping to maintain the integrity of the fluid seal.

Since a butterfly valve is not a balanced valve, the static pressure drop across its surface and the impact of the fluid during flow produce a thrust load on the disc that tends to carry the disc downstream. Tests have shown that this thrust load is not evenly distributed on the disc except at the fully opened or fully closed position. At all intermediate positions, the thrust load on the wing of the disc turned toward the upstream side of the valve is greater than that on the downstream wing. To minimize this thrust load problem, the disc shaft of butterfly valves according to the present invention is offset from the flow passage axis, thereby permitting the short wing of the disc to enter the fluid flow first when the valve is installed so that fluid flow is in the intended direction. Furthermore, the axis of the disc shaft is also displaced axially from the valve seat, so that the seat establishes an unbroken annular seal interface with the disc. This feature facilitates equal sealing forces to be exerted around the entire circumference of the disc, with a result that all points along this circumference, including those in the shaft area, lift away from the seat when the valve is open, and contact the seat when the valve is closed. Thus, there is no pivoting or twisting action exerted against the valve seat, and the valve therefore can be opened and closed with very little, if any, scuffing of the seat, and with significantly less torque than would be otherwise needed.

Because damage to the annular seat could result if the valve flow control element were rotated 360 degrees about its shaft axis, the valves according to the present invention are also provided with mechanical stops to prevent over-travel of the flow control element from the fully closed to the fully opened position. Furthermore, a stop system for the fully closed position, comprising surfaces on the flow control element and the valve body, is preferably included in valves of this invention to prevent over-rotation of the flow control element past the exact position where ideal sealing is achieved.

Butterfly valves are frequently used for throttling service, i.e., wherein the valve is employed to reduce downstream pressure to some fraction of the prevailing upstream pressure, but is not fully closed to completely shut off flow there through. Since the configuration of the seat of this invention would subject it to highly erosive forces when fluid is throttled through the valve, the invention includes the provision of an annular shoulder or lip on the retainer ring that projects inwardly into the flow channel through the valve in front of the seat. This shoulder or lip causes the fluid flow to arch over the seat, and thus portects the seat from direct high-velocity impingement.

BRIEF DESCRIPTION OF THE DRAWINGS

FIG. 1 is a central vertical section of a butterfly valve embodying the features of the present invention.

FIG. 2 is a partial end elevation of the valve of FIG. 1 in the fully open position.

FIG. 3 is an enlarged fragmentary section taken along line 3—3 of FIG. 2.

FIG. 4 is a view like FIG. 3, with the valve in the closed position at ambient temperature.

FIG. 5 is a view like FIG. 4, but with the valve at a low temperature.

FIG. 6 is a view like FIG. 5, but showing the valve under fluid pressure.

DESCRIPTION OF THE PREFERRED EMBODIMENT

As illustrated in FIGS. 1 and 2, a butterfly valve 20 incorporationg the features of the present invention with a bi-directional seat for controlling fluid flow in either direction includes a generally annular body 22 defining a fluid flow passage 24, the illustrated body being adapted for insertion between opposed standard pipe flanges (not shown). Rotatably supported in the flow passage 24 is a fluid control disc 26 with a circumferential sealing surface 28, the surface 28 preferably having a spherical configuration. The disc sealing surface 28 is adapted to cooperate with an annular bi-directional valve seat 30 that preferably is formed from a stiff, but flexible polymeric material such as polytrichlorofluoroethylene, polytetrafluoroethylene, or the like. The seat 30 resides in an annular seat chamber 32 formed by a counterbore in the valve body 22, and a rigid seat energizer ring 34 fits snugly against the lends support to the seat 30. The seat and the energizer ring are retained in the seat chamber 32 by a retainer ring 36 that is releasably secured to the valve body 22 by cap screws 38 or other suitable means, the cap screws applying a sufficient axial load on the retainer ring 36 to affect a fluid seal between the seat and the valve body, and also facilitating quick and easy installation or removal of the seat without necessitating removal of the disc 26 or otherwise disassembly of the valve. When the seat 30 is being installed, the valve should be in its illustrated fully closed condition since the seat is free-floating and thus will center itself diametrically against the disc 26 and thus establish a complete, unbroken sealing interface with the disc spherical surface 28.

The outer radial surface 40 of the energizer ring 34 is frusto-conical in configuration and diverges away from the ring's inner radial surface 42 in a radial outward direction, so that the energizer ring has a generally wedge-shaped configuration in cross section. The inner radial surface 44 of the retainer ring 36 is complementary in shape to the outer surface 40 of the energizer ring 34, thus also being frusto-conical. These mating frusto-conical or sloping surfaces 40, 44 cause the energizer ring 34 to move in an axial direction towards the seat 30 as the energizer ring contracts or shrinks inwardly toward the flow passage axis when the valve temperature is lowered. Accordingly, no matter how low temperature might be to which the valve 20 is subjected, the seat 30 is always held in a fluid-tight manner against the valve body 22. The seat 30 has an outwardly extending annular support leg 46 that preferably includes an annular tang 48 (FIGS. 3-6), this tang cooperates with a mating surface 49 on the energizer ring 34 to prevent dislodgement of the seat from its correct position, when, for example, the rate of fluid flow through the valve is quite high.

As illustrated in FIGS. 3-6, the seat 30 of the present invention has a pair of annular outer sealing lips 50, 52 that extend in opposite directions from the support leg 48 and generally axially along the spherical sealing surface 28 of the disc 26, and a central sealing lip 53 which extends radially inwardly from the support leg 46 toward the sealing surface 28. The outer sealing lips 50, 52 establish a thin annular fluid-tight contact with the disc surface 28 when the valve is closed, as best seen in FIG. 4.

When the valve is subjected to low temperature, for example when it is used to control the flow of cryogenic fluids, the seat 30 has a tendency to shrink at a rate which is faster than the shrink rate of either the disc 26 or the energizer ring 34. If the shrink rate of the seat were not controlled the pressure between the seat and the disc would increase so much that the torque required to open the valve would be very high at cryogenic temperatures. However, in the valve of the present invention, when the seat 30 starts to shrink the tank 48 of the seat engages the surface 49 of the energizer ring 34 so that the energizer ring limits the radially inward movement of the seat. Thus, the shrink rate of the energizer ring 34 controls the rate at which the seat 30 shrinks toward the disc 26. By selecting materials for the energizer ring 34 that have the proper differential expansion rate, the ring 34 can be constructed to respond to any temperature decrease such that it will very slowly increase the pressure it applies to the seat 30 both axially and radially, as the temperature decreases. For example, if the valve body 22 and the retainer ring 36 are constructed of metal having a relatively low contraction rate, such as Type 316 stainless steel, and if the energizer ring 34 is constructed of aluminum or other metal with a relatively high coefficient or rate of contraction, when the temperature is lowered or the results would be as diagrammatically indicated in FIG. 5, wherein the energizer ring 34 contracts at a faster rate and to a greater extent than the retainer ring 36. This causes the energizer ring 34 to migrate along the sloping surface 44 of the retainer ring and results in an increase in pressure exerted by the energizer ring 34 against the seat 30, both radially and axially. The radial inward movement of the seat 30 causes the outer lips 50, 52 to be pressed more firmly against the sealing surface 28 (FIG. 5), and causes the central lip 53 to be pressed against the sealing surface 28 to provide an additional fluid-tight contact with the sealing surface 28 of the disc 26. Thus the energizer ring 34 is able to compensate for the shrinkage of all of the other elements of the valve 20 while maintaining, the load it exerts on the seat 30. Of course, and as will be readily understood, the slope or angle of the mating frusto-conical surfaces 40, 44 has an influence on the extent of the relative movement between the energizer ring 34 and retainer ring 36, and by increasing this slope a greater load will result on the seat 30, whereas decreasing the slope will reduce this load.

When the closed valve is subjected to fluid pressure on the left side of the disc as indicated by the arrow A in FIG. 6, the width of the annular seat-disc contact is significantly increased due to fluid pressure freely entering pressure actuated cavity 54 and urging the outer lip 50 radially inward against the disc sealing surface 28, thereby intensifying the fluid barrier between the disc 26 and the seat 30. In like manner, if fluid pressure is applied from the right side of the disc as shown by arrow B in FIG. 6, the outer lip 52 will be urged inwardly against the disc sealing surface 28, thereby intensifying the fluid barrier between the disc 26 and the outer lip 52.

As illustrated in FIG. 4, when the valve operates at or near the ambient temperature only the outer lips 50, 52 contact the sealing surface 28 of the disc 26 so that the fluid-tight seal is provided by the outer lips only. However, when the temperature decreases to a level considerably below ambient, the central lip 53 is pressed against the sealing surface 28, as illustrated in FIG. 5, to thereby provide an additional fluid-tight seal at the lower temperatures where the outer lips may need help in maintaining the valve seat in fluid-tight contact with the sealing surface. Thus, the amount of contact between the central sealing lip 53 and the sealing surface 28 changes from no contact at ambient temperature to fluid-tight seal at low temperatures. This change in contact is provided by the novel shape of the annular seat 30, and by the construction of the energizer ring 34 and the retainer ring 36.

It can be readily appreciated that when the valve 20 is employed in cryogenic service for example to control the flow of liquefied gas with 600:1 expansion ratio, any fluid entrapped around the seat 30 very likely might have a damaging affect on the seat as the valve is warmed. To obviate this problem, the valve 20 is provided with vent passages 56, 58, 60 (FIG. 1) between the body 22 and the seat 30, energizer ring 34, and retainer ring 36, thereby facilitating free flow of liquids and gases and from the outer end of the seat's support leg 46.

In order to minimize the resistance to fluid flow through the valve 20, a two-piece valve shaft (FIG. 1) comprising upper element 70 and lower element 72 is employed with the disc 26. The upper shaft element 70 has a hexagonal end 76 that is axially slidably received in a complementary hexagonal socket 78 in the disc 26, while the lower shaft element 72 is secured to the disc by a means of a roll pin 79 in the well-known manner. The upper shaft 70 is retained in the bonnet portion 80 of the valve body 22 by snap ring 82 that fits in a groove 84 in a counterbore of the bonnet, and that bears against a cooperating radial flange 86 on the upper shaft 70. The upper and lower shaft elements 70, 72 are supported in the valve body by upper and lower sleeve type bearings 88, 90 respectively, which bearings can be constructed of a bronze backing strip, an intermediate section of porous bronze filled with a mixture of polytetrafluoroethylene and lead, and a thin surface layer of the same polymerlead mixture. Thus, any torque created by a valve actuated mechanism is transmitted by the upper shaft 70 to the disc 26 and subsequently to the lower shaft element 72, assuring that both shaft elements and the disc rotate in unison as the valve is opened or closed. Furthermore, no matter in which direction fluid pressure is applied to the disc 26, the shaft bearings 88, 90 fully support the pressure load, assuring no loading of the seat 30 by the disc 26. In addition, the upper shaft bearings 88 function as a fluid barrier, preventing the free flow of liquid upwardly in the valve's bonnet 80 thereby preventing excessive leakage due to distortion. Other details of the mechanical operation of a typical butterfly valve may be seen by referring to my aforementioned U.S. Pat. No. 3,997,142 and such mechanical details are not considered critical to the present invention.

Although the present invention has been described as embodied in a butterfly valve, it should be understood that the invention can also be utilized in other types of rotary valves, and therefore is not restricted in application to the foregoing constructions.

Although the best mode comtemplated for carrying out the present invention has been herein shown and described, it will be apparent that modification and variation may be made from what is regarded to be the subject matter of this invention.

What is claimed is:

1. A pressure-sensitive temperature-responsive rotary valve having a generally annular valve body defining a fluid flow passage, a fluid flow control element rotatably supported in the flow passage for controlling the flow of fluids through the valve, an annular yieldable, pressure-responsive valve seat positioned in the flow passage for cooperation with the flow control element to establish a fluid flow barrier through said passage, a temperature-responsive valve seat energizer ring positioned in the flow passage for imposing a force on the valve seat to cause the seat to establish a fluid-tight seal with the flow control element and the valve body, said energizer ring having an annular frusto-conical surface, and means for retaining the energizer ring in position against the valve seat, said retaining means having a frusto-conical surface complementary to and in contact with the energizer ring frusto-conical surface and wherein the coefficient of contraction of said energizer ring is greater than the coefficient of contraction of said retainer means and said valve body whereby when the valve is subjected to a reduction in temperature the energizer ring contracts more than the valve body and the retainer means, the contraction of said energizer ring causes a radial inward movement of said energizer ring forcing said frusto-conical surface of said energizer ring against the frusto-conical surface of said retainer means, moving said energizer ring against said valve seat to cause said energizer ring to exert a sealing force radially and axially on said valve seat when the valve is subjected to a reduction in temperature, the improvement in the valve seat comprising:

a leg portion extending generally outward from the flow passage, at least one outer pressure-responsive sealing lip extending in a generally axial direction from the leg portion along the surface of the flow control element when said element is in closed position, and a central sealing lip extending in a generally radial direction from the leg portion toward the flow control element, said outer sealing lip being longer than said central sealing lip causing said outer sealing lip to contact said closed flow control element and causing said central sealing lip to be positioned adjacent to but spaced from said closed flow control element at ambient temperatures, contraction of said energizer ring at lower temperatures forcing said central sealing lip against said closed flow control element to provide an additional flow barrier when the valve is subjected to a reduction in temperature.

2. A rotary valve as defined in claim 1 wherein said radial sealing force on said valve seat by said contracting energizing ring forces said outer sealing lip more firmly against the surface of said flow control element.

3. A rotary valve as defined in claim 1 wherein said outer sealing lip includes a sloping surface that diverges outwardly away from the adjacent surface of said flow control element when the valve is closed, whereby sealing contact between said flow control element and said valve seat begins with annular thin-line contact between said outer lip and said surface of said flow control element and the area of sealing contact progressively increases with an increase in fluid pressure.

4. A rotary valve according to claim 1 wherein said energizer ring cooperates with said retainer ring to vary the magnitude of sealing contact of the valve seat with the flow control element in response to temperature cycling.

5. A rotary valve according to claim 1 wherein the valve seat comprises two outer pressure-responsive annular sealing lips extending in opposite directions from the leg portion of said valve seat.

6. A pressure-sensitive temperature-responsive rotary valve comprising:

a generally annular valve body defining a fluid flow passage;

a fluid flow control element rotatably supported in the flow passage for controlling the flow of fluids through the valve;

a flexible, annular, pressure-responsive valve seat positioned in the flow passage for cooperation with the flow control element to establish a fluid flow barrier through said passage, said valve seat including a leg portion extending generally outward from the flow passage, a pair of outer pressure-responsive sealing lips extending in a generally axial direction from the leg portion along the flow control element when said element is in its closed position, and a central sealing lip extending in a generally radial direction from the leg portion toward the flow control element, said central sealing lip being shorter than said outer sealing lips causing said outer lips to contact said closed flow control element and causing said central sealing lip to be positioned adjacent said closed flow control element at ambient temperatures;

a temperature-responsive valve seat energizer ring positioned in the flow passage for imposing a force on the valve seat to cause said seat to establish a fluid-tight seal with said flow control element and said body valve, said energizer ring having an annular frusto-conical surface;

means for retaining the energizer ring in position against the valve seat, said retaining means having a frusto-conical surface complementary to and in contact with the energizer ring frusto-conical surface; and wherein the coefficient of contraction of said energizer ring is greater than the coefficient of contraction of said retaining means and said valve body, when the valve is subjected to a reduction in temperature the energizer ring contracts more than the valve body and the retaining means, the contraction of said energizer ring causes a radial inward movement of said energizer ring forcing said frusto-conical surface of said energizer ring against the frusto-conical surface of said retaining means, moving said energizer ring against said valve seat forcing said central sealing lip against said closed flow control element to provide an additional flow barrier when the valve is subjected to a reduction in temperature.

7. A rotary valve as defined in claim 6 wherein said energizer ring has an annular frusto-conical surface and said retaining means includes a frusto-conical surface complementary to and in contact with the energizer ring frusto-conical surface.

8. A rotary valve as defined in claim 7 whereby a reduction in temperature causes said energizer ring to exert a seal-effecting force both radially and axially on the valve seat, thereby to maintain a fluid flow barrier through said passage.

9. A rotary valve as defined in claim 8 wherein said contraction of said energizer ring causes said outer sealing lips to be forced more tightly against the flow control element.

10. A rotary valve as defined in claim 8 wherein said seat includes a tang extending generally axially from one side of said leg portion toward said energizer ring and wherein said energizer ring includes a mating surface which restrains said seat from moving radially toward said flow control element.

* * * * *